March 20, 1962 F. AUTEM 3,026,007
HOSIERY INSPECTING APPARATUS
Original Filed April 11, 1955 9 Sheets-Sheet 3
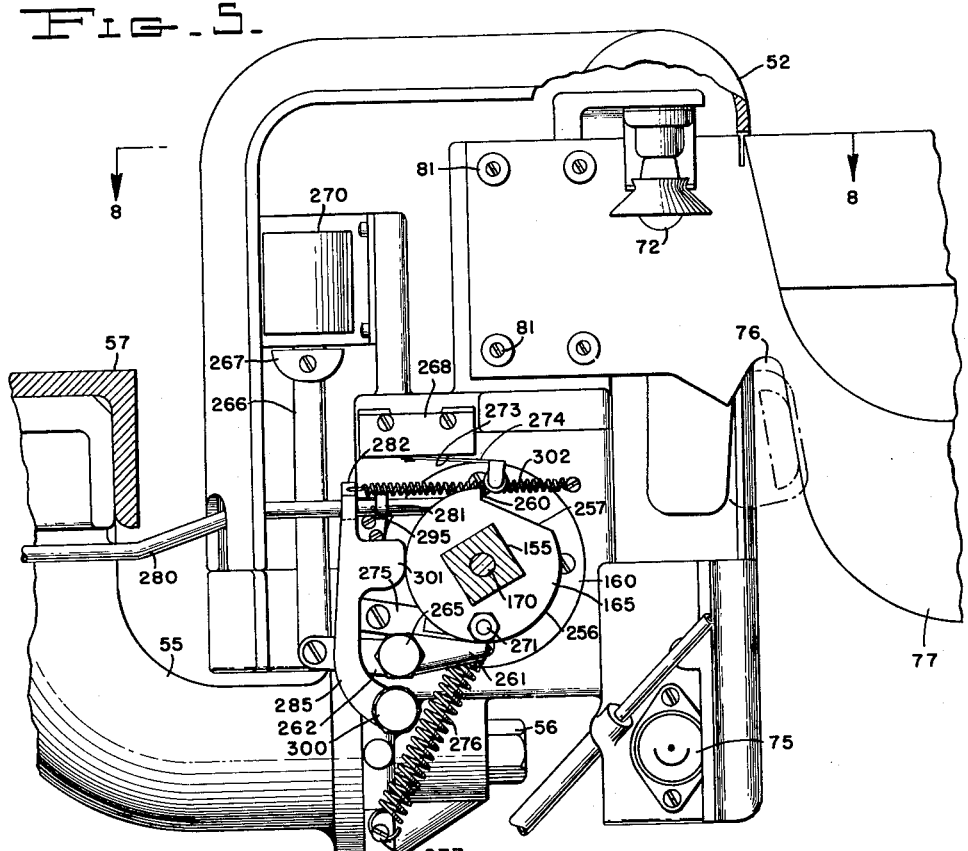
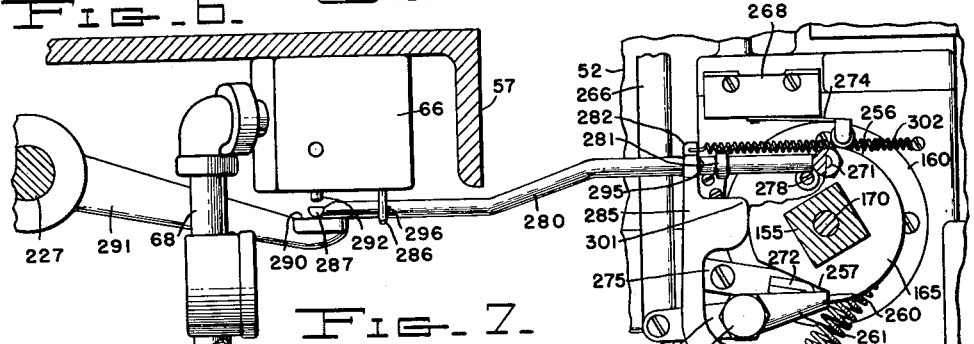
INVENTOR.
Fred Autem
BY Mead, Browne, Schuyler & Beveridge
ATTORNEY.

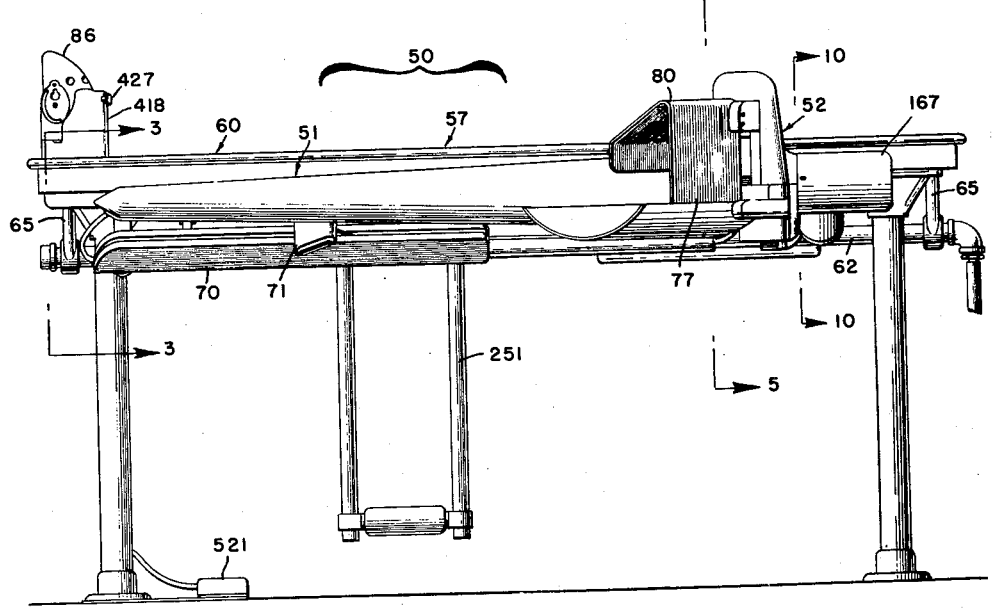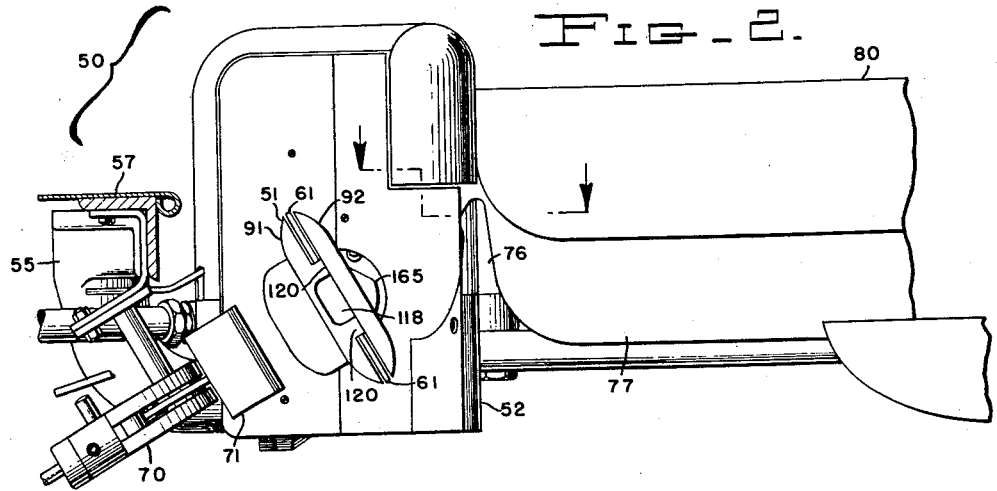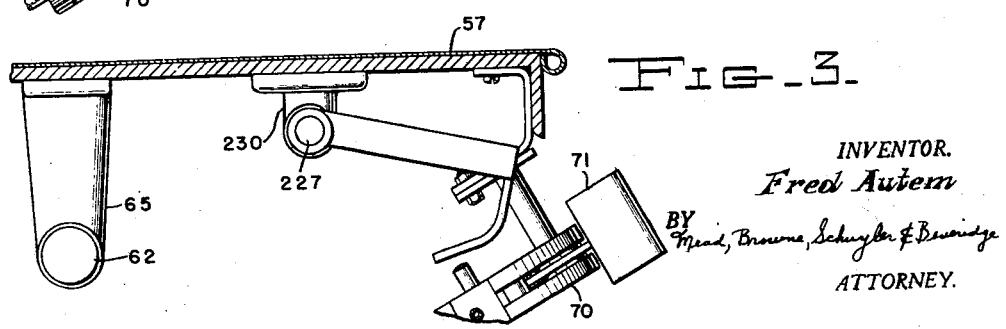

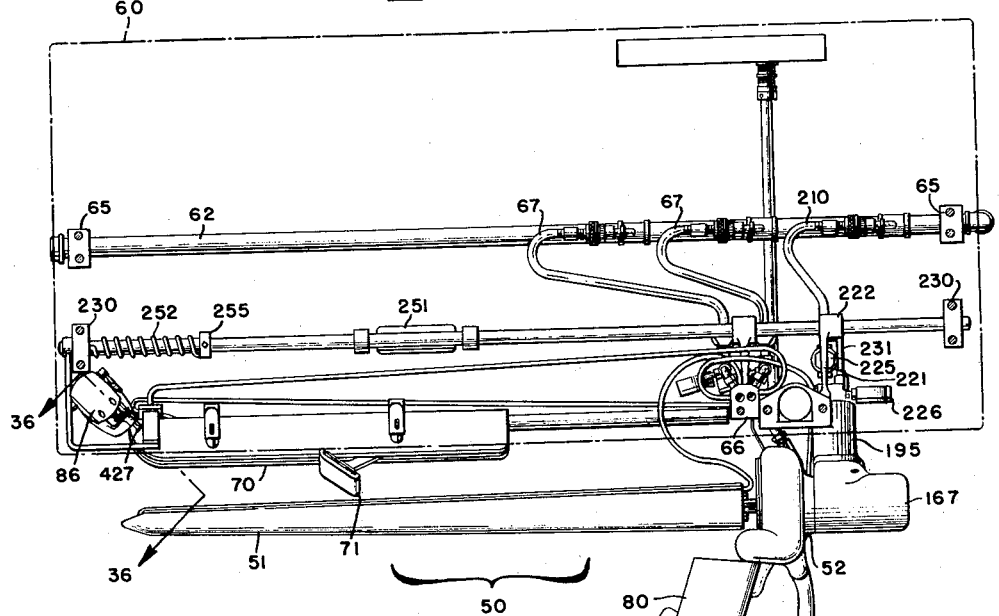
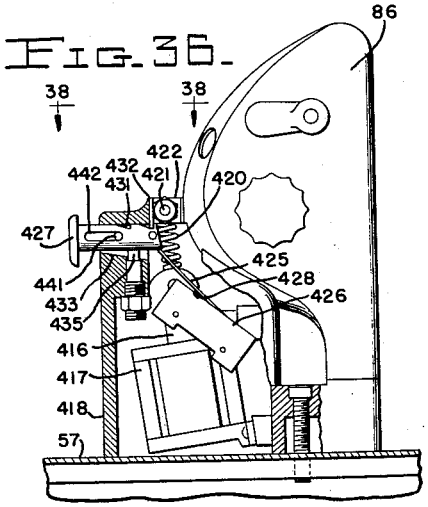
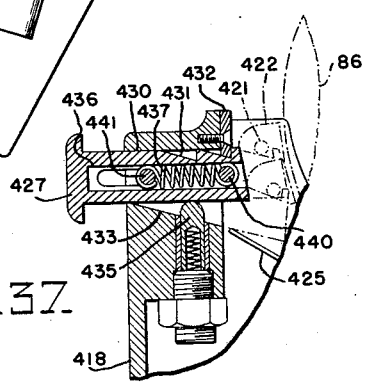
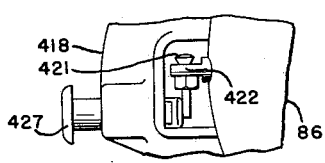

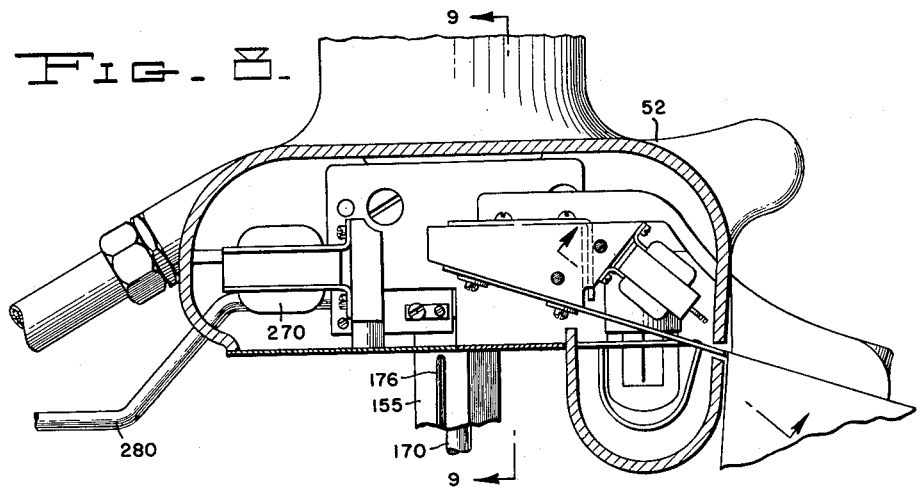
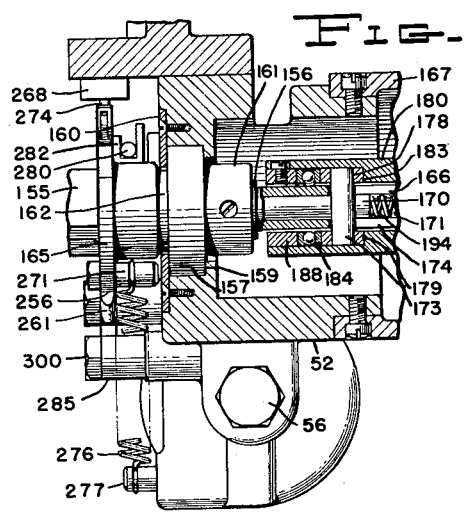

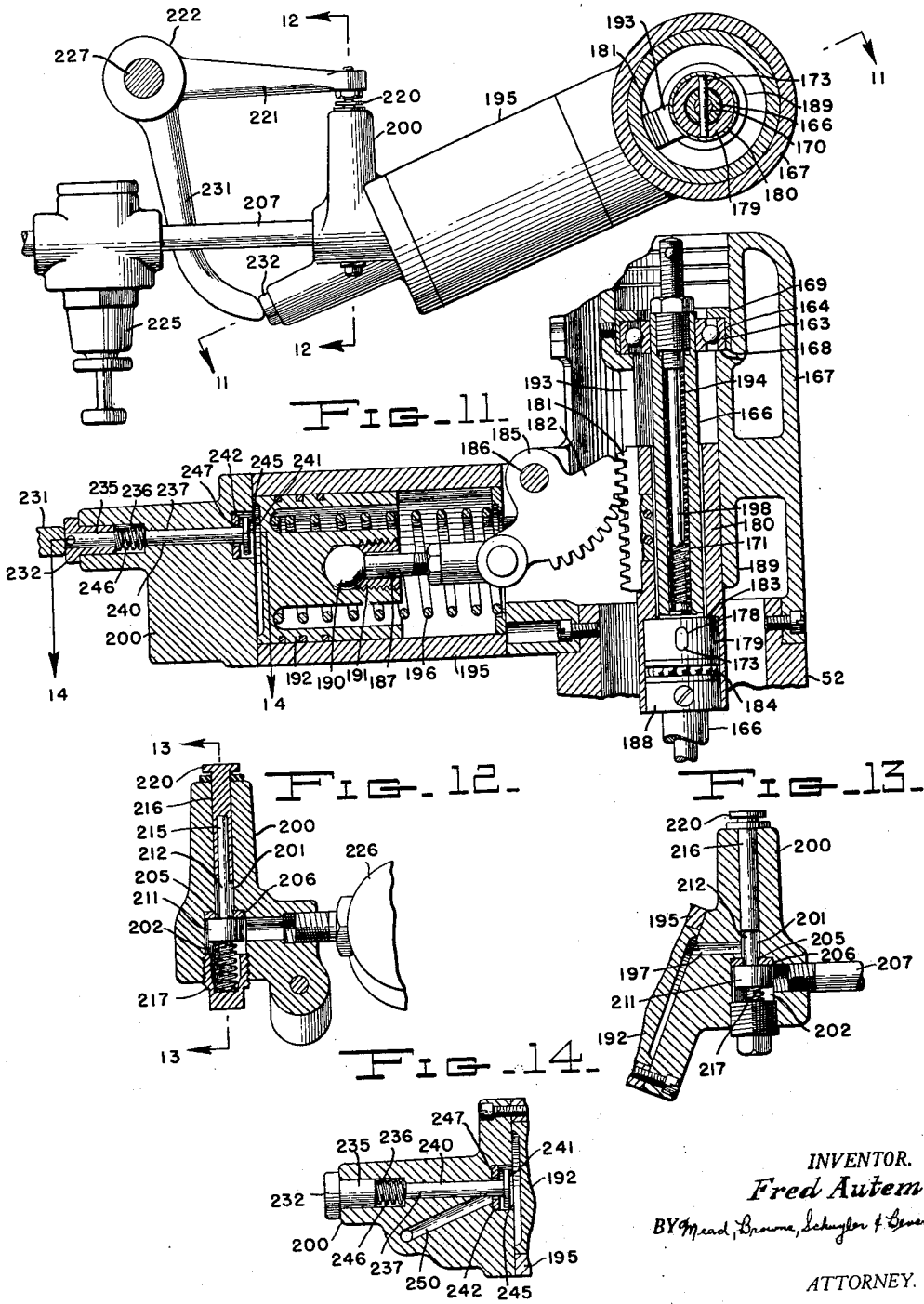

March 20, 1962 F. AUTEM 3,026,007
HOSIERY INSPECTING APPARATUS
Original Filed April 11, 1955 9 Sheets-Sheet 6
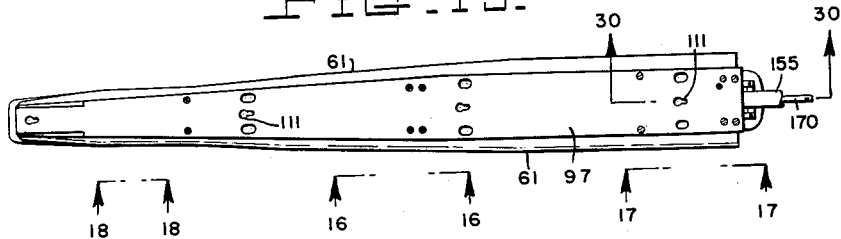
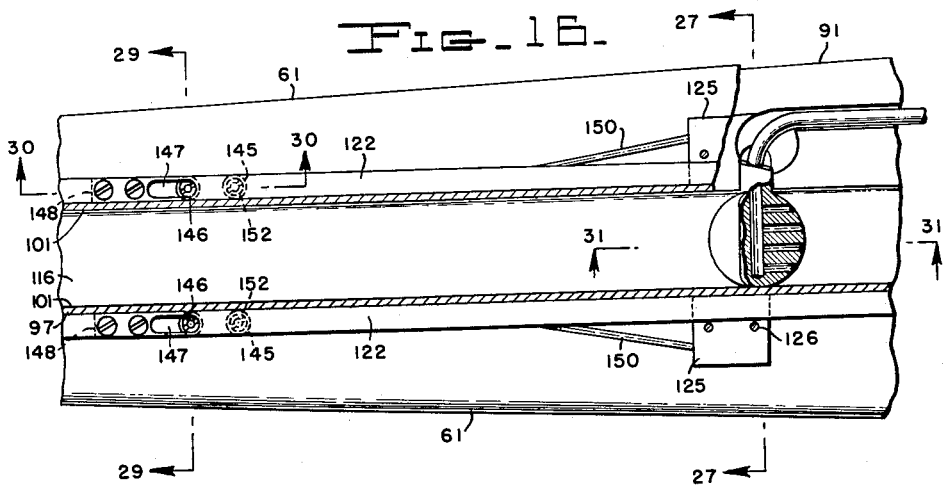
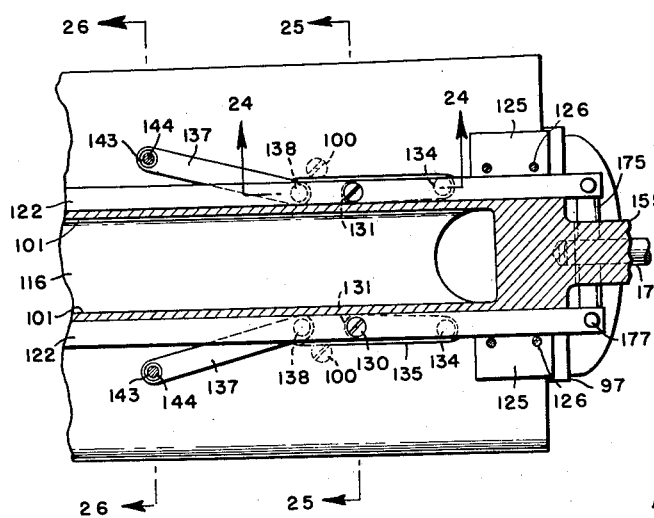
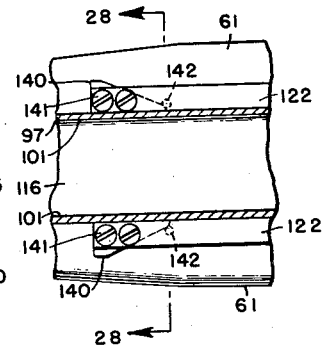
INVENTOR.
*Fred Autem*
BY *Mead, Browne, Schuyler & Beveridge*
ATTORNEY.

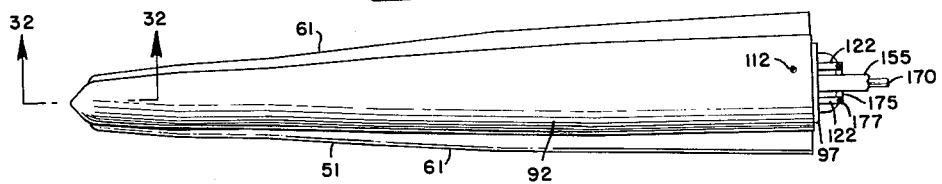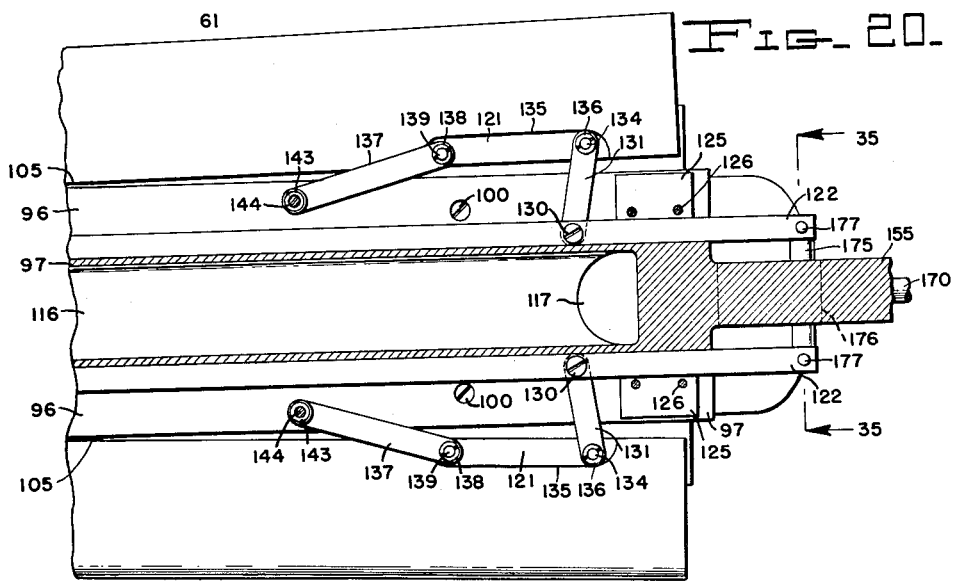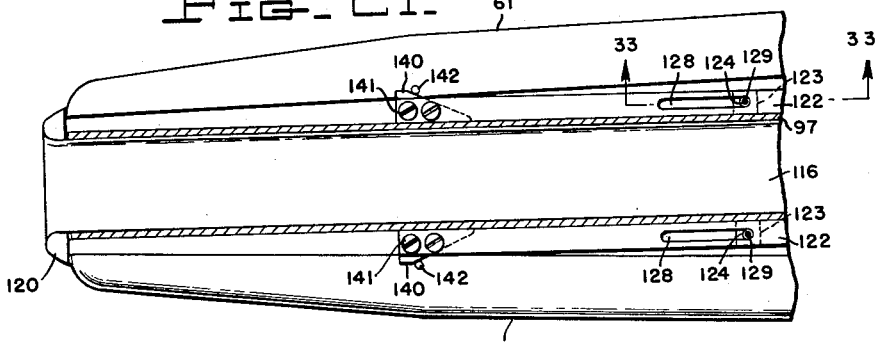

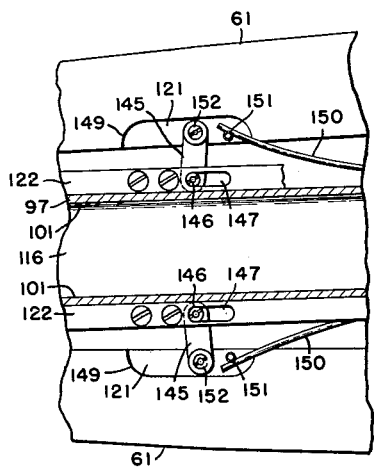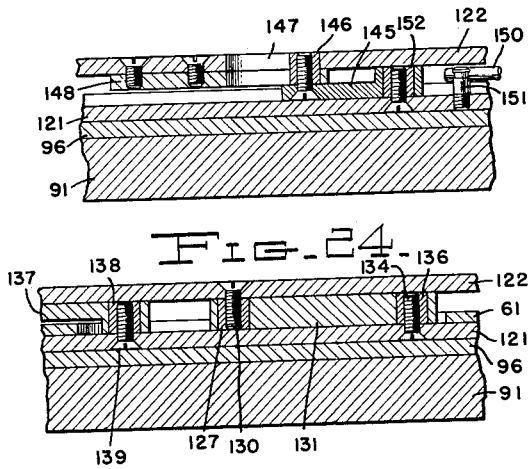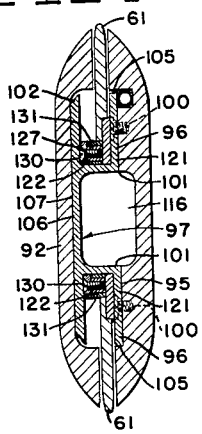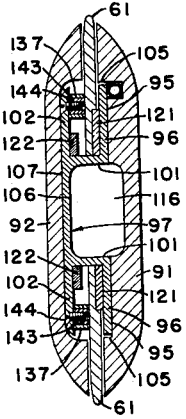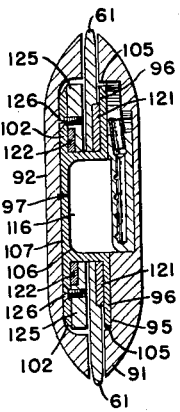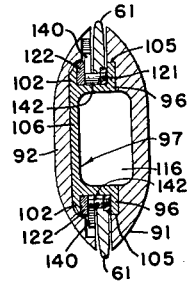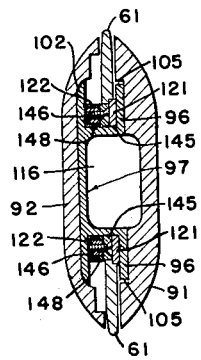

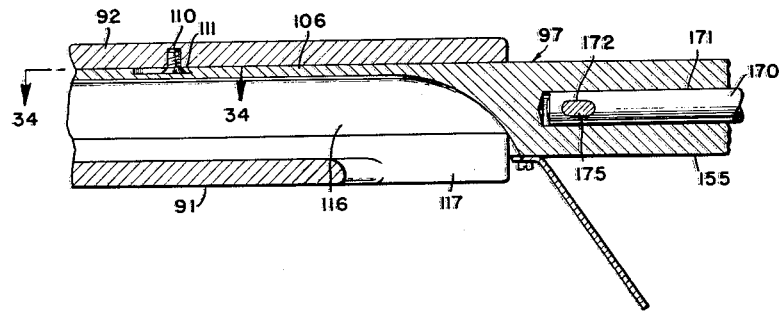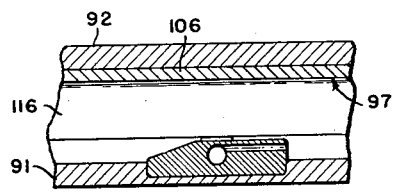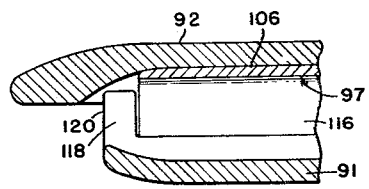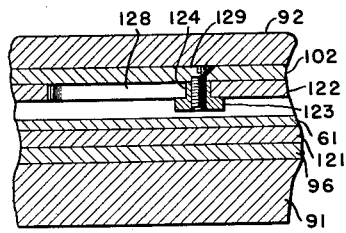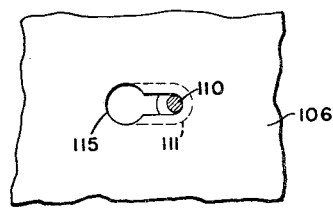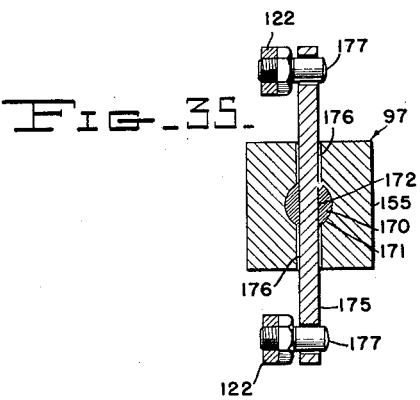

United States Patent Office 3,026,007
Patented Mar. 20, 1962

1

3,026,007
HOSIERY INSPECTING APPARATUS
Fred Autem, Mount Penn, Pa., assignor, by mesne assignments, to Southern Textile Machinery Co. Inc., Paducah, Ky., a corporation of Kentucky
Original application Apr. 11, 1955, Ser. No. 500,570, now Patent No. 2,957,613, dated Oct. 25, 1960. Divided and this application Jan. 13, 1960, Ser. No. 2,137
15 Claims. (Cl. 223—77)

This invention relates to a hosiery inspecting device and particularly to an improved hosiery inspection form. This application is a division of my copending application Serial No, 500,570 filed April 11, 1955 for Hosiery Inspection Apparatus, now Patent No. 2,957,613.

In the normal production of stockings such as women's full-fashioned hosiery, the stockings are visually inspected at an intermediate point in their production prior to finishing operations for the purposes of discovering and segregating those having defects in the fabric or seams. In the past, this inspection has been performed with a form of general stocking shape supported at one end. The form is provided with means for expanding the stocking to place the fabric under tension, and is mounted for rotation on a longitudinal axis to permit both sides of the stocking to be presented in turn to the operator. In the operation of this form the stockings, which are received from prior operations in an "inside out" condition, are first everted, which operation is performed by hand, and then are drawn onto the form over the free end with the welt or open end of the stocking being moved onto the form until the stocking toe is in contact with the free end of the form. In more recently developed forms the stockings are drawn onto the form in their "inside out" condition and everted as they are removed from the form. The stockings which pass inspection are then moved on for later finishing operations.

A primary object of this invention is the provision of an inspection device of the stocking expanding type which automatically performs certain of the operations to accelerate the inspection cycle and reduce handling of the stockings with the result that increased production is obtained and fewer stockings are injured during the inspecting and turning operation.

To accomplish this object, a passageway is provided in the form through which the stocking is conveyed, the passageway having an entrance opening adjacent the free end and an exit opening adjacent the other end. Accordingly, the toe end will first enter the passageway, the remainder of the stocking following and the entire stocking will be everted during this operation.

Another object of the invention is the provision of an inspection device of the stocking expanding type wherein the stockings are placed under tension during the inspection cycle of expandable members the actuation of which is coordinated with the other operations of the inspection cycle.

Another object of the invention is the provision of an inspection device of the stocking expanding type wherein the stocking form is rotatable from initial to final inspection positions which rotation is coordinated with the other operations of the inspection cycle.

A further object of the invention is the provision of means for locking the rotatable form in its final inspection position to facilitate the final inspection and everting of the stocking, which locking means are then released to return the form to its initial position for the start of another inspection cycle.

A still further object of the invention is the provision of means for counting the stockings during the everting operation, which counting means actuates the release of the stocking form for return to its initial position.

2

A still further object of the invention is the provision of means for releasing the stocking form from its final inspection position without completion of the inspection and everting cycle when the stocking is found to be defective.

My invention will be more fully understood and further objects and advantages of the invention will become apparent when reference is made to the following more detailed description and drawings wherein:

FIG. 1 is a front elevational view of a stocking device including an expanding form and means for counting and turning the stockings inside out in accordance with the invention;

FIG. 2 is an end elevation on an enlarged scale of a portion of the device as seen from the left of FIG. 1, parts being shown in cross-section;

FIG. 3 is a view partly in end elevation and partly in cross-section taken on the plane 3—3 as indicated in FIG. 1 and shown enlarged relative to FIG. 1;

FIG. 4 is a plan view of the device of FIG. 1 with the table top indicated in a dot and dash outline;

FIG. 5 is a view partly in elevation and partly in cross-section of certain of the control means of the device taken substantially on the plane 5—5 as indicated in FIG. 1 and shown enlarged with respect to FIG. 1;

FIG. 6 is a view similar to a portion of FIG. 5, the view being extended to include details not shown in FIG. 5 and the parts being shown in different operating positions;

FIG. 7 is a view similar to a portion of FIG. 5, the parts being broken away to more clearly show additional details of the control means;

FIG. 8 is a cross-sectional plan view taken substantially on the plane 8—8 as indicated in FIG. 5;

FIG. 9 is a view partly in cross-section and partly in elevation taken substantially on the plane 9—9 as indicated in FIG. 8;

FIG. 10 is a view of the control means for the expanding form partly in elevation and partly in cross-section taken on the plane 10—10 as indicated in FIG. 1 and shown enlarged relative to FIG. 1;

FIG. 11 is a cross-sectional view taken on the plane 11—11 as indicated in FIG. 10;

FIG. 12 is a cross-sectional view taken substantially on the plane 12—12 as indicated in FIG. 10;

FIG. 13 is a cross-sectional view taken on the plane 13—13 as indicated in FIG. 12;

FIG. 14 is a cross-sectional view taken substantially on the plane 14—14 as indicated in FIG. 11;

FIG. 15 is a plan view on a reduced scale of the expanding form with the upper shell half removed;

FIG. 16 is a detailed plan view on an enlarged scale of the portion of the expanding form shown substantially within the arrows 16—16 of FIG. 15, parts being broken away and shown in cross-section in order to illustrate other parts in the background;

FIG. 17 is a detailed plan view similar to FIG. 16 showing the portion of the expanding form substantially within the arrows 17—17 in FIG. 15;

FIG. 18 is a detailed plan view similar to FIG. 16 showing the portion of the expanding form substantially within the arrows 18—18 of FIG. 15;

FIG. 19 is a plan view of the expanding form similar to FIG. 15 but with the upper shell in place and the showing of the stocking expanders extended;

FIG. 20 is a view similar to FIG. 17 with the parts shown in different positions relative to FIG. 17;

FIG. 21 is a plan view of the left end of the expanding form with the upper shell half removed and parts being broken away and shown in cross-section;

FIG. 22 is a view similar to a portion of FIG. 16 with certain of the parts shown in different positions relative to FIG. 16;

FIG. 23 is a cross-sectional view on an enlarged scale taken substantially on the plane 23—23 as indicated in FIG. 16;

FIG. 24 is a cross-sectional view on an enlarged scale taken substantially on the plane 24—24 as indicated in FIG. 17;

FIG. 25 is a cross-sectional view taken substantially on the plane 25—25 as indicated in FIG. 17;

FIG. 26 is a cross-sectional view similar to FIG. 25 taken on the plane 26—26 as indicated in FIG. 17;

FIG. 27 is a cross-sectional view similar to FIG. 25 taken substantially on the plane 27—27 as indicated in FIG. 16;

FIG. 28 is a cross-sectional view similar to FIG. 27 taken substantially on the plane 28—28 as indicated in FIG. 18;

FIG. 29 is a cross-sectional view similar to FIG. 28 taken on the plane 29—29 as indicated in FIG. 16;

FIG. 30 is a cross-sectional view on an enlarged scale taken on the plane 30—30 as indicated in FIG. 15;

FIG. 31 is a cross-sectional view through the expanding form taken on the plane 31—31 as indicated in FIG. 16;

FIG. 32 is a cross-sectional view on an enlarged scale taken on the plane 32—32 as indicated in FIG. 19;

FIG. 33 is a cross-sectional view through the expanding form taken substantially along the plane 33—33 as indicated in FIG. 21;

FIG. 34 is a detailed plan view taken on the plane 34—34 as indicated in FIG. 30;

FIG. 35 is a cross-sectional view on an enlarged scale taken on the plane 35—35 as indicated in FIG. 20;

FIG. 36 is a view in elevational and partly in cross-section of the counting means of the device taken substantially on the plane 36—36 of FIG. 4 and shown enlarged relative to FIG. 4;

FIG. 37 is a view on an enlarged scale similar to a portion of FIG. 36 with certain parts being shown in different relative positions and other parts being in cross-section to further clarify their construction; and, FIG. 38 is a plan view on an enlarged scale of a portion of the mechanism of FIG. 36 taken in the direction of the arrows 38—38 of FIG. 36.

Referring to the drawings and particularly FIGS. 1 and 4, an apparatus according to the instant invention for inspecting and turning stockings is indicated generally at 50 and includes a flat form 51 having a free end over which a stocking blank may be drawn welt end first until the toe of the stocking is against the free end of the form. Form 51 is rotatably mounted in a housing 52, as hereinafter set forth, which is secured to a bracket 55 by means of a bolt 56 (FIGS. 5 and 9). Bracket 55 is secured to the underside of a top portion 57 of a table 60 to support form 51 in a position extending along the front of the table. Form 51 is provided with expander members or fins 61 which may be projected outwardly to stretch the stocking, by means described below, operated by compressed air or other fluid under pressure from a supply pipe or conduit 62 supported in brackets 65 secured to the underside of the table (FIGS. 3 and 4).

After inspecting the side of the stocking on the flat side of form 51 facing the operator, the form is partially rotated from its initial inspecting position to bring the other side of the form into its final inspecting position and the form is then latched in this latter position. After the final inspection of the stocking, expander members 61 are retracted, which institutes a cycle of operations including the drawing of the stocking through the interior of the form to turn the stocking right side out, counting the stockings, placing the stocking in a tray or other container and returning the form to its initial position for the start of another inspecting and turning cycle. For this purpose apparatus 50 also includes a control valve 66 which is carried on the underside of top portion 57 of table 60, the valve being connected to compressed air conduit 62 by air line 68 (FIG. 6) including sections of flexible hose 67 or the like. Control valve 66 is connected to the interior of form 51 to direct a current of air toward the back or welt end of the form and is connected to the motive means for a pushing unit indicated generally at 70 having a pushing member 71 which is constructed and operated, as hereinafter set forth, to engage and push the stocking toward the free or toe end of the form to assist the current of air to draw the stocking off the form and through the interior thereof.

As the toe end of the stocking emerges or is ejected by the air from the exit opening at the back end of the form 51 it is deflected through a light beam of a photoelectric device including a light tube 72 and a photo-tube or cell 75 into an opening or passage 76 formed between one wall 77 of a channel-shaped member 80 secured to the housing 52 by screws 81 (FIG. 5) and a portion of the housing (FIG. 2). The toe portion of the stocking in passing through the light beam energizes an electrical circuit to cause operation of a counting device 86 (FIG. 36) which registers the number of the stocking inspecting cycles, and causes release of the form 51 for return to its position for the start of a subsequent inspecting cycle.

Form 51 comprises outer shell halves 91 and 92 (FIGS. 25 to 29) preferably formed of "Bakelite" or other plastic material which may be highly polished to provide a smooth friction free surface to permit the stockings to be readily drawn thereover. In plan view (FIG. 15) the form has a symmetrical outline which will extend the various portions of the stocking without exerting excessive initial tension in the stocking fabric. Shell half 91 is recessed as at 95 to receive side wall portions 96 of a central shaft or frame member 97, the frame member extending along substantially the full length of the shell half 91 and being secured thereto as by screws 100 (FIG. 25). As shown in FIGS. 25 to 29, inclusive, the side walls 96 of the frame member 97 are connected by end walls 101 to side wall portions 102, the side and end walls forming channel sections 105 opening toward the side edges of form 51. The channel sections are joined by a center web 106 which is aligned with walls 102, the web and walls 102 engaging the bottom surface of a recess 107 in shell half 92 and acting to space the shell halves from each other. The tapered heads of screws 110 secured in shell half 92 interfit in rabbeted slots 111 in web 106 of frame member 97 (FIGS. 30 and 34) to removably attach shell half 92 to frame member 97. A screw 112 passing through shell half 92 and secured in frame member 97 maintains shell half 92 in correct position with respect to shell half 91. To remove shell half 92 from frame member 97, screw 112 is removed and the shell half shifted toward the left, as viewed in FIGS. 30 to 34. to align the heads of screws 110 with enlarged apertures 115 at the left ends of slots 111 which permit the heads of screws 110 to be removed from the slots.

As shown in FIGS. 25 to 29, and walls 101 and web 106 of frame member 97 define an aperture which is in register with a recessed portion in shell half 91 to form an unobstructed passageway 116 extending through form 51 from an entrance opening 118 at the forward or toe end (FIG. 32) to an exit opening 117 formed in shell half 91 at the rear or welt end of the form (FIG. 30). The end of shell half 92 is shaped to fit the toe tip of the stocking and extends beyond the end of shell half 91 (FIG. 32) to facilitate entry of the stocking into opening 118 of the passageway 116. As shown in FIGS. 2 and 21, the toe end of shell half 91 has rounded top portions 120 formed thereon to cover the end edges of walls 101 of frame member 97 and to define entrance opening 118.

Shell halves 91 and 92 are spaced from each other to provide elongated openings through which the expander members or fins 61 extend. Fins 61 are preferably of the same or similar material as shell halves 91 and 92 and are provided with stiffening plates 121 preferably of metal, which engage the inner surfaces of walls 96 in frame member 97 to guide fins 61 in movement in channel sections 105. Fins 61 are normally in retracted positions in which they engage wall portions 101 of frame member 97. For projecting fins 61 outwardly from the side edges of form 51, actuating rods 122 are provided (FIG. 4), one being associated with each of the fins. Actuating rods 122 extend along channel sections 105 of frame member 97 and are guided for sliding movement in the channel sections between walls 102 and blocks 125 secured to the side walls adjacent the rear end and center of form 51, respectively, by screws 126 (FIGS. 16, 17 and 27). Each actuating rod 122, adjacent the toe end of form 51, is also guided between an enlarged head 123 of a member 124 which extends through a slot 128 in the actuating rod and is secured to side wall 102 by a screw 129 (FIGS. 21 and 33).

The actuator rod 122 for each fin 61 has a bushing or nut 127 secured adjacent the rear portion of form 51, as by screw 130, bushing 127 providing a pivotal mounting for one end of a link 131 (FIGS. 24 and 25). Link 131 lies in a cutout 135 in fin 61 and is pivotally connected at its other end to stiffening plate 121 by a bushing 136 secured to the stiffening plate by screw 134. One end of a stabilizer link 137 is pivotally mounted on a bushing 138 secured by a screw 139 to stiffening plate 121, the other end of link 137 being pivotally mounted on a bushing 143 secured to side wall 102 of the frame member 97 by a screw 144 (FIG. 26). Stabilizer link 137 acts to maintain the fins in predetermined lengthwise position between shell halves 91 and 92 during the movement of the fins between retracted and projected or stocking expanding positions.

Adjacent to the forward or toe end of form 51 each actuator rod 122 has a cam block 140 secured thereto by screws 141, cam block 140 being adapted to engage a pin or follower 142 carried in the stiffening plate 121 of the adjacent expander member 61 (FIGS. 18, 21 and 28). A further link 145 lies in a cutout 149 in each fin 61 and has one end pivotally mounted on a bearing member 152 secured to the stiffening plate 121 (FIG. 23). The other end of link 145 carries a bushing 146 which is slideably received in a slot 147 formed in actuator rod 122. A stiffening plate 148 is secured to the actuator rod at this point (FIG. 23). Wire springs 150 having one end fixed in the blocks 125 adjacent the center of the form 51, are adapted to engage pins 151 carried in stiffening plates 121 (FIGS. 16 and 22) to bias the fins toward their retracted positions.

As shown in FIGS. 16, 17 and 18, with the actuator rods 122 in their left position, fins 61 are in retracted position, and links 131 and 145 lie substantially parallel to end walls 101 of the frame member 97 with the bearing portions 146 of links 145 against the right ends of slots 147 in the actuator rods. Pins 142 in the fins are on the low parts of the cam blocks 140. Upon movement of the actuator rods 122 toward the right, links 131 and 145 swing outwardly about bearing members 127 and 146, respectively, and pins 142 rode up the inclined portions of cam blocks 140 to project fins 61 outwardly against the pressure of springs 150 (FIGS. 19, 20, 21 and 22). As the actuator rods 122 approach the end of their movement to the right, the left ends of slots 147 engage bearing members 146 to complete the outward swing of the links 145.

As hereinbefore set forth, form 51 is rotatable to permit inspection of both sides of a stocking on the form. For this purpose frame member 97 has a square extension 155 with a round portion 156 rotatably carried in a ball bearing 157 mounted in housing 52, as shown in FIG. 9. Bearing 157 is maintained in fixed position in housing 52 between a shoulder 159 of the housing and a plate 160 secured to the housing (FIG. 9). Shaft 156 is held in fixed axial position between a collar 161 fixed on the shaft in abutting relation with bearing 157 and a thrust washer 162 carried on the shaft between bearing 157 and a thrust washer 162 carried on the shaft between the bearing and the hub portion of a disk 165 secured to extension 155, the purpose of the disk being hereinafter set forth. Shaft 156 has a portion 166 of reduced diameter which extends through and is supported in a second ball bearing 163 carried in a sleeve 164 fixed in a portion 167 of housing 52. Bearing 163 is held in fixed position between a shoulder 168 in housing portion 167 and a flange 169 on sleeve 164, as shown in FIG. 11.

Actuator rods 122 are moved along channel sections 105 of frame member 97 to retract and project fins 61 by a rod 170 which is slideable in the hollow interior 171 of extension 155 and shaft portions 156 and 166 of frame member 97. Rod 170 is provided with an aperture 172 for a cross member 175, the ends of the cross member extending from opposite sides of the rod through slots 176 in extension 155 for engagement with a stud 177 carried in each of the actuator rods (FIG. 35).

Rod 170 carries a cross pin 173 which extends from opposite sides of the rod through a slot 174 in the shaft portion 166 into apertures 178 in a collar 179 (FIGS. 9 and 11). Collar 179 is rotatably carried in a sleeve 180 between a shoulder 183 of the sleeve and a thrust bearing 184 which is held in position in the sleeve by a collar 188. Sleeve 180 is axially slideable in a bearing 189 formed in portion 167 of the housing and carries a rack member 181 extending through and interfitting in a slot 193 in the bearing (FIG. 10) to prevent rotative movement of the sleeve in the bearing. Rod 170 and sleeve 180 are biased downwardly, as viewed in FIG. 11 or to the left as viewed in FIG. 9, by a spring 194 which is positioned in hollow interior 171 in shaft portion 166 between the end of the rod and a pin 198 adjustably carried in the end of the shaft portion. From the foregoing it is apparent that shaft portions 156 and 166 may rotate, but cannot move axially within housing 52, and that sleeve 180 may move axially, but cannot rotate relative to the shaft portions.

Sleeve 180 and rod 170 are slideably moved by engagement of the teeth of rack member 181 with the teeth of a segmental gear portion 182 of a lever 185 pivotally mounted on a pin or shaft 186 carried in portion 167 of housing 52. Lever 185 is pivotally connected to one end of a link 187, the other end of the link having a ball end 190 for engagement in a socket 191 formed in a piston 192 which is slideably mounted in a cylinder housing 195 forming part of portion 167. Normally, piston 192, lever 185 and rack member 181 are positioned as in FIG. 11, to which position they are biased by a spring 196.

Movement of piston 192 upwardly from the FIG. 11 position rotates lever 185 counterclockwise and moves rack member 181 and rod 170 to move actuator rods 122 and project fins 61. Movement of piston 192 is accomplished by compressed air which is introduced against the back of piston 192 through an opening 197 in a valve housing 200 (FIGS. 11 and 13) forming the cap or cover for cylinder housing 195 (FIGS. 10 and 11). Opening 197 is connected to an upper chamber 201 in valve housing 200 which in turn is connected to a lower chamber 202 through an enlarged opening 205 in a washer 206 (FIGS. 12 and 13) of a plastic material such as rubber or the like. Lower chamber 202 is connected by a pipe or conduit 207 having a flexible portion 210 releasably connected to the air conduit 62 (FIG. 4). Opening 205 in the washer is sealed by a head 211 of a valve 212 having a stem portion 215 extending into and engaging the end of a recess in a tappet 216 slideable in valve housing 200. Head 211 is normally seated by a spring 217 against washer 206 to seal opening 205. Tappet 216 has a head 220 which is engaged and depressed by one arm 221 of a lever 222 to disengage head 211 from washer 206 to thereby permit the air to pass from lower chamber 202 through opening 205 in the washer and into upper chamber 201 and opening 197 to actuate piston 192. An adjusting valve 225 is provided in conduit 207 (FIG. 10) to regulate the flow of air from supply conduit 62 to piston 192 and the pressure of the air flow is indicated by a gauge 226 carried in valve housing 200 in communication with lower chamber 202 (FIGS. 4 and 12).

Lever 222 is secured to a shaft 227 which is pivotally supported in brackets 230 secured to the underside of table top 57 (FIGS. 3 and 4). Lever 222 has a second arm 231 which is adapted to engage an enlarged head 232 of a bushing 235 slideably mounted in an aperture 236 in valve housing 200. Bushing 235 is secured to a stem portion 237 of a relief valve 240 slidably carried in valve housing 200, and having a head 241 which is adapted to be seated against a pliable washer 242 in an aperture 245 communicating with the back of piston 192, as shown in FIG. 11. A spring 246 in aperture 236 between the bottom surface thereof and bushing 235 biases head 241 of valve 240 against washer 242 to close an enlarged opening 247 in the washer which communicates with a passageway 250 extending through valve housing 200 and opening to the outside atmosphere (FIG. 14). When arm 221 is turned clockwise to depress valve 212 to open the air line to the back of piston 192, arm 231 is also moved to permit spring 246 to seat valve head 241 against washer 242 to close passageway 250. Movement of arms 221 and 231 counterclockwise permits spring 217 to seat valve head 211 against washer 206 and depresses valve 240 to open passageway 250 to exhaust air from the cylinder housing as spring 196 returns piston 192 to its position of FIG. 11. A foot treadle 251 on shaft 227 serves as the means for turning arms 221 and 231 in the clockwise direction. A torsion spring 252 surrounding shaft 227 and having its ends anchored in one of brackets 230 and a collar 255 fixed on the shaft (FIG. 4) biases the shaft and arms to their counterclockwise position (FIG. 10) which position is determined by engagement of head 232 of bushing 235 with valve housing 200.

After inspecting the stocking on one flat side of form 51, the form is rotated to present the other face thereof for inspection and the form latched in the latter position. Referring now particularly to FIGS. 5, 6 and 7, an outer peripheral edge 256 of disk 165 has a notch 257 formed therein, one wall or surface 260 of which extends along a radial line passing through the center of rod 170. Wall 260 is adapted to be engaged by a free end portion or latch element 261 of a lever 262 which is pivotally mounted on a stud 265 carried in housing 52 (FIGS. 5 and 6). The other end of the lever 262 is pivotally connected to one end of a link 266. The other end of link 266 is pivotally connected to a core member 267 of a solenoid 270 carried in housing 52. A limit switch 268 secured to housing 52 has a button 273 which is actuated by a spring blade 274 secured to the switch, the blade acting, when in engagement with outer edge 256 of disk 165, to close the switch and acting to release the button and open the switch when the blade drops into notch 257 of the disk. Solenoid 270 and limit switch 268 are connected in the electrical circuit of the apparatus as and for the purpose hereinafter set forth. A pin 271 carried in and extending from a side face of disk 165 engages a bumper member 272 of leather or rubber or other resilient material carried in a bracket 275 secured to housing 52 (FIGS. 5 and 7) to determine the clockwise position of form 51. The counterclockwise movement of form 51 to final inspecting position is limited by engagement of pin 271 with a bumper member 278 secured to plate 160. Disk 165 and form 51 are biased clockwise to the initial inspecting position of the form when end portion 261 is released from wall 260 by a spring 276 which is connected between pin 271 and a pin 277 in the housing 52 (FIG. 9).

Pin 271 in disk 165 is also adapted to engage one end of a rod 280 which is guided for sliding movement in a bracket 281 secured to the housing (FIGS. 5 and 6). Rod 280 extends to the left through a forked end portion 282 of a lever 285 (FIGS. 6 and 9) and between a pair of guide pins in control valve 66, one of which is shown at 286. A left end portion 287 of rod 280 is supported for sliding movement on a flat portion 290 of a lever 291 secured to shaft 227. Rod 280 is shifted to the left by pin 271 to position the end 287 beneath buttons 292 in control valve 66 for purposes hereinafter set forth. Rod 280 carries a pin 295 for engagement with bracket 281 to limit the movement of the rod toward the right (FIG. 5) and carries a second pin 296 for engagement with guide pins 286 to limit the movement of the rod toward the left (FIG. 6). Lever 285 is pivotally mounted on a stud 300 carried in housing 52 and is provided with a follower portion 301 for engagement with edge 256 of the disk 165. A spring 302 connected between the forked end 282 of lever 285 and housing 52 biases the lever toward disk 165.

At the start of an inspecting and turning cycle, disk 165 is in its position of FIG. 5, rod 280 is in its position to the right with end 287 of the rod withdrawn from beneath buttons 292 of control valve 66. Foot treadle shaft 227 and lever 291 are in their counterclockwise positions.

With a stocking on form 51, foot treadle 251 is actuated to rotate shaft 227 to project fins 61, and to move lever 291 clockwise to the position of FIG. 6. After inspecting one side of the stocking, form 51 and disk 165 are rotated counterclockwise to engage end portion 261 of lever 262 with wall 260 in notch 257 of the disk. During rotation of disk 165 the pin 271 engages and moves rod 280 to the left to position end portion 287 beneath buttons 292. When foot treadle 251 is released and turned counterclockwise to starting position, lever 291 moves end portion 287 to engage and depress buttons 292 to open the air lines to form 51 and pushing unit 70. When the inspecting cycle is completed, lever 262 is actuated by solenoid 270 to release disk 165 which is returned clockwise to initial position (FIGS. 5 and 7) by spring 276. As disk 165 is turned clockwise, follower portion 301 of lever 285 enters notch 257 in the disk, and lever 285 is biased clockwise by spring 302 to engage pin 295 and move rod 280 to the right. Movement of rod 280 to the right withdraws end 287 from beneath buttons 292 to close the air lines to form 51 and pushing unit 70.

When the toe of the stocking blank is ejected from the passageway 116 in the form 51, it is deflected through and breaks the light beam passing between the light tube 72 and the photocell 75. Breaking the light beam between the light tube 72 and the photocell 75 causes operation of a core member 416 of a solenoid 417 which is connected in the aforementioned electrical circuit of the device and is carried in a housing 418 secured to the top portion 57 of the table 60 (FIG. 36). The core member 416 is connected by a spring 420 to a pin 421 carried in the free end of an operating lever 422 of the counting device 86 (FIGS. 36 and 38). A counting device 86 is carried in the housing 418 and is suitably of the type shown and described in U.S. Patent No. 2,679,358 issued to F. Autem, May 25, 1954. The lever 422 is adapted to engage and operate a spring plate 425 to actuate a button 428 and close a normally open limit switch 426, in the housing 418, during each counting movement of the lever 422.

At times it is desirable that the movement of the lever 422 by the solenoid 417 be limited to prevent a counting operation of the device 86 but be sufficient to engage and operate the spring plate 425 to close the limit switch 428. For this purpose there is provided a push pin 427 which is mounted for horizontal sliding movement in an aperture 430 in the housing 418, the aperture having a tapered lower surface 433 to also permit vertical locking movements of the pin, as viewed in FIGS. 36 and 37. The push pin 427 has two notches 431 in its upper surface for engagement with a plate 432 secured to the housing 418, the notches determining the inactive position of the push pin, shown in full lines, and the active position, shown in dot and dash outline, in FIG. 37, in which latter positioned push pin is in the path of the pin 421 of the lever 422. The push pin 427 is releasably held in position to engage the plate 432 in either notch 431 by a spring pressed detent pin 435 carried in a portion of the housing 418, the detent pin being readily depressible to permit movement of the push pin to either its active or inactive position. The push pin 427 has a central aperture 436 to receive a spring 437 which is connected between a pin 440 in the push pin and a pin 441 which extend through a slot 442 in the push pin into the housing 418. The spring 437 tends to bias the push pin 427 toward its inactive position of FIG. 37. When the push pin 427 is in the active position, shown in dot and dash outline, and the solenoid 417 is actuated to move the lever 422 through a counting cycle, the pin 421 engages in the forward notch 431 in the push pin and rotates the push pin around the pin 441 against the action of the detent pin 435. Rotation of the push pin 427 is arrested when it engages the tapered surface 433 (as indicated in dotted outline in FIG. 37) and the movement of the lever 422 is likewise arrested before completing its full counting stroke. In this position the other notch 431 in the push pin 427 is disengaged from the plate 432 and the push pin is maintained in active position by engagement of the pin 421 in the forward notch 431. Also at this time the push pin 427 engages the spring plate 425 to close the limit switch 426. As the lever 422 is returned to its position of FIG. 36, the spring 437 draws the push pin 427 to its left or inactive position and the detent pin 435 presses the push pin upwardly to engage the plate 432 in the forward notch 431.

From the foregoing it is believed that the structure and operation of apparatus 50 will be obvious to those skilled in the art. However, for the purpose of clarity the operation of the apparatus through a stocking inspecting and turning cycle is hereinafter summarized as follows:

With form 51 in its initial position of FIGS. 1 and 2, a stocking with the wrong side out is drawn onto the form and foot treadle 251 is then manually operated to turn shaft 227 clockwise, as viewed in FIG. 10, to depress valve 212 against the action of spring 217 and open the air line from conduit 62 to cylinder housing 195. As air is introduced into housing 195, piston 192 is operated to move actuating rods 122 to project expander members 61 (FIG. 19) and stretch the stocking on the form. At this time, lever 291 is in its clockwise position of FIG. 6. After inspecting the stocking on the side of the form facing the operator, the form is manually rotated approximately 180° to bring the other side of the form facing the operator. Rotation of form 51 to this final inspecting position permits end 261 of lever 262 to engage surface 260 of notch 257 in disk 165 to hold the form in this latter position. Also during rotation of the disk edge 256 of the disk actuates button 273 to close switch 268 and rod 280 is moved to the left as viewed in FIG. 6 to position end 287 of the rod beneath buttons 292 of the control valve.

Following the final inspection of the stocking, foot treadle 251 is released and shaft 227 and lever 222 are turned counterclockwise by spring 252 to release valve 212 which is closed by spring 217 to shut off the air to cylinder housing 195 and to open the valve 240. Spring 196 thereupon operates piston 192 to move actuating rods 122 to the left from the position of FIG. 20 to the position of FIG. 17 to retract expander members 61, the action of spring 196 being supplemented by the action of springs 150 acting on the fins.

Operation of the lever 422 closes the switch 426 to close and energize the electric circuit to operate the solenoid 270 and disengage the lever 262 from the notch 257 in the disk 165 following which the form 51 is rotated clockwise from the final inspecting position of FIG. 6 to its initial position of FIG. 5 by the spring 276.

When form 51 is in the final inspecting position and it is found that the stocking on the form is defective, the form may be released for return to its initial position before releasing foot treadle 251 by manually closing switch 521. Closing switch 521 operates solenoid 270 to disengage lever 262 from notch 257 in disk 165. Foot treadle 251 is then released and the defective stocking manually removed from the form without turning it.

It will be understood that the improvements specifically shown and described, by which the above results are obtained, can be changed and modified in various ways without departing from the invention herein disclosed and hereinafter claimed.

I claim:

1. In a stocking inspecting and turning device, a stocking form comprising spaced form members defining elongated openings therebetween, elongated expander members in said openings, actuator means within said form for moving said expander members between retracted and expanded positions, and means defining a stocking passageway longitudinally of said form within the interior thereof.

2. In a stocking inspecting and turning device, a stocking form comprising relatively flat shell members, means maintaining said shell members in spaced relationship to define elongated openings therebetween, elongated expander members in said openings, actuator means within said form for moving said expander members between retracted and expanded positions, and means defining a stocking passageway longitudinally of said form within the interior thereof.

3. In a stocking inspecting and turning device, a stocking form comprising relatively flat shell members, a frame member extending longitudinally of the form and spacing said shell members to define elongated openings therebetween, elongated expander members in said openings, actuator means within said form for moving said expander members between expanding and retracting positions, and a stocking passageway extending longitudinally of the form and defined in part by said frame member.

4. In a stocking inspecting and turning device, a stocking form comprising relatively flat shell members, a frame member extending longitudinally of the form and spacing said shell members to define elongated openings therebetween, means fixedly securing one of said shell members to said frame member and means removably securing the other shell member to the frame member, said last named means comprising headed elements on one of said other shell member and frame member and rabbeted slots for receiving the heads of the elements in the other of said members.

5. In a stocking inspecting and turning device, a stocking form comprising relatively flat shell members, a frame member extending longitudinally of the form and spacing said shell members to define elongated openings therebetween, elongated expander members in said openings, actuator means for moving said expander members between expanding and retracted positions, a stocking passageway extending longitudinally of the form from an entrance opening adjacent the free end thereof and defined in part by said frame member and in part by one of said shell members, said one shell member projecting past said entrance opening to define a terminal point of the form.

6. In a stocking inspecting and turning device, a relatively flat stocking form having a longitudinally extending opening in an edge thereof, an elongated expander member for projection through said opening, a longitudinal shiftable actuating member within said form, a link pivotally connected at spaced points to said actuating member and to the expander member respectively, and a cam carried by one of said members and a cam follower carried by the other for movement by said cam, whereby longitudinal shifting of said actuating member in one direction causes a stocking expanding movement of said expander member.

7. In a stocking inspecting and turning device, a relatively flat stocking form having a longitudinally extending opening in an edge thereof, an elongated expander member for projection through said opening, a longitudinally shiftable actuating member within said form, a link pivotally connected to said actuating member and expander member, a second actuating link having an end pivotally connected to said expander member and an end pivotally and slideably mounted in a longitudinal slot in said actuating member, an inclined cam carried by said actuating member at a point remote from said first link, and a follower carried by said expander member for cooperation with said cam whereby longitudinal movement of said actuator member in one direction causes movement of said expander member to expanding position, and resilient means for returning the expander member to retracted position upon movement of the actuator member in the opposite direction.

8. In a stocking inspecting device, a stocking form comprising relatively flat shell halves, a frame member extending longitudinally of the form and spacing said shell halves to define elongated openings therebetween, elongated expander members in said openings, longitudinally shiftable actuator rods within said form, actuating links each pivotally connected to one of said actuator rods and an adjacent expander member, second actuator links each having an end pivotally connected to one of said expander members and having an end slideably and pivotally mounted in a longitudinal slot in an adjacent actuator rod, an inclined cam carried by each of said actuator rods, followers carried by adjacent expander members for cooperation with said cams, and stabilizing links each having one end pivotally connected to the frame member and its other end pivotally connected to an adjacent expander member, whereby longitudinal movement of said actuator rods in one direction causes movement of said expander members to stocking expanding positions, and resilient means for returning the expander members to retracted positions upon movement of said actuator rods in the opposite direction.

9. In a stocking inspecting device, a stocking form having a free end, hosiery expander means carried by the form, means including longitudinally movable actuator rods within said form for moving said expander members between stocking expanding and retracted positions, an extension from said form opposite said free end, means supporting said extension for rotation of said form between initial and final inspection positions, a member slideable longitudinally of said extension, means connecting said actuator rods to said slideable member for movement therewith, and means for operating said slideable member.

10. In a stocking inspecting device, a stocking form having a free end, hosiery expander means carried by the form, means including longitudinally movable actuator rods within said form for moving said expander means between stocking expanding and retracted positions, a hollow extension from said form opposite said free end, means supporting said extension for rotation of the form between initial and final inspection positions, a member within said hollow extension and slideable longitudinally thereof, means connecting said actuator rods to said slideable member for movement therewith, and a fluid motor means for operating said slideable member.

11. In a stocking inspecting device, a stocking form having a free end, hosiery expander means carried by the form, means including longitudinally movable actuator rods within said form for moving said expander means between stocking expanding and retracted positions, a hollow extension from said form opposite said free end, means supporting said extension for rotation of the form between initial and final inspection positions, a member within said hollow extension and slideable longitudinally thereof, means connecting said actuator rods to said slideable member for movement therewith, a fluid motor means, and a rack and pinion device for transmitting motion from said motor means to said slideable member.

12. In a stocking inspecting device adapted to operate in an inspection cycle, a stocking form having a free end, an extension from said form opposite said free end, means supporting said extension for rotation to permit the form to be turned between initial and final inspection positions, a member mounted for rotation with said form, latch means cooperating with said member for releasably locking said form in final inspection position and means operable upon the completion of an inspection cycle for releasing said latch means.

13. In a stocking inspecting device adapted to operate through an inspection cycle, a stocking form having a free end, an extension from said form opposite said free end, means supporting said extension for rotation to permit the form to be turned between initial and final inspection positions, a disk mounted for rotation with said extension, a notch in said disk, a latch element, means normally urging said latch element against the periphery of the disk whereby the latch element enters the notch upon alignment therewith, and means for withdrawing the latch element from the notch upon completion of an examining cycle.

14. In a stocking inspecting and turning device a stocking form, means mounting the form for rotation between initial and final inspection positions, means for locking the form in final inspection position, a stocking counter having an operating member movable between idle and counting positions, means for moving said member to counting position, means including an electric circuit for releasing said locking means, a normally open switch in the circuit, and means for closing the switch upon movement of the operating member to counting position.

15. A stocking inspecting and turning device as defined by claim 14 having manually controlled means movable from an idle position to an active position for stopping movement of the operating member at an intermediate point before it reaches counting position, said manually controlled means operating to close said switch upon such movement of the operating member to the intermediate point.

References Cited in the file of this patent

UNITED STATES PATENTS

| | | |
|---|---|---|
| 2,601,229 | Shoaf et al. | June 24, 1952 |
| 2,679,358 | Autem | May 25, 1954 |
| 2,883,093 | Autem | Apr. 21, 1959 |

FOREIGN PATENTS

| | | |
|---|---|---|
| 801,937 | Great Britain | Sept. 24, 1958 |